Feb. 14, 1928.

J. W. BISHOP 1,659,077

MACHINE FOR MAKING BILLIARD CHALK OR THE LIKE

Filed Feb. 18, 1925 4 Sheets-Sheet 1

Feb. 14, 1928.

J. W. BISHOP 1,659,077

MACHINE FOR MAKING BILLIARD CHALK OR THE LIKE

Filed Feb. 18, 1925

Inventor:
Joseph W Bishop
By: Wm O Bell
Atty.

Feb. 14, 1928.
J. W. BISHOP
1,659,077
MACHINE FOR MAKING BILLIARD CHALK OR THE LIKE
Filed Feb. 18, 1925
4 Sheets-Sheet 3
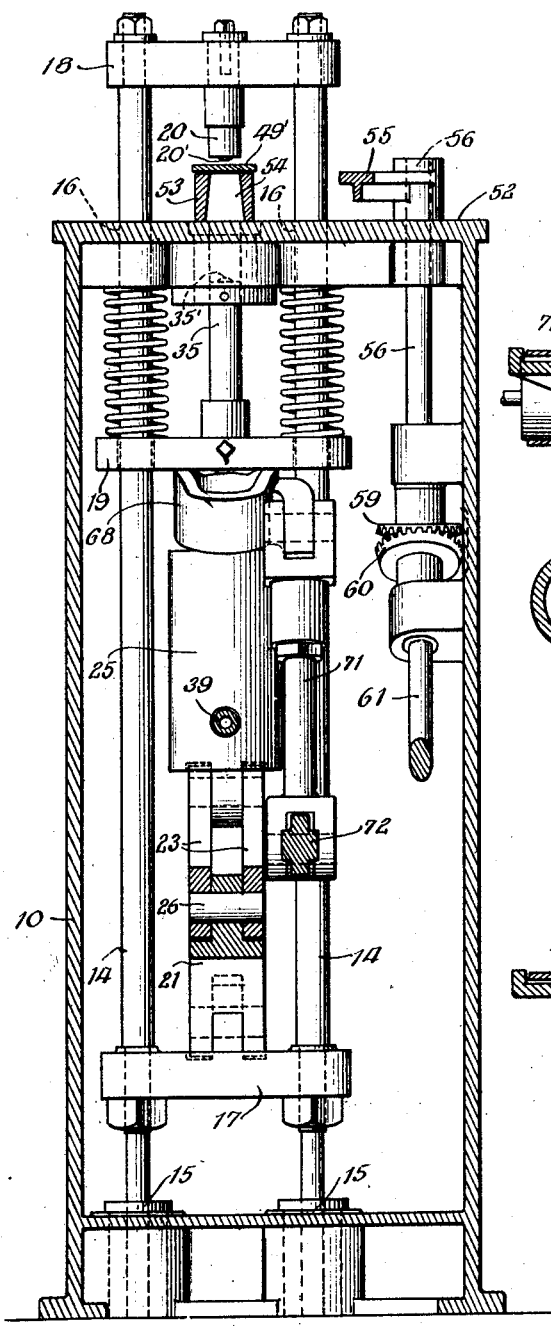
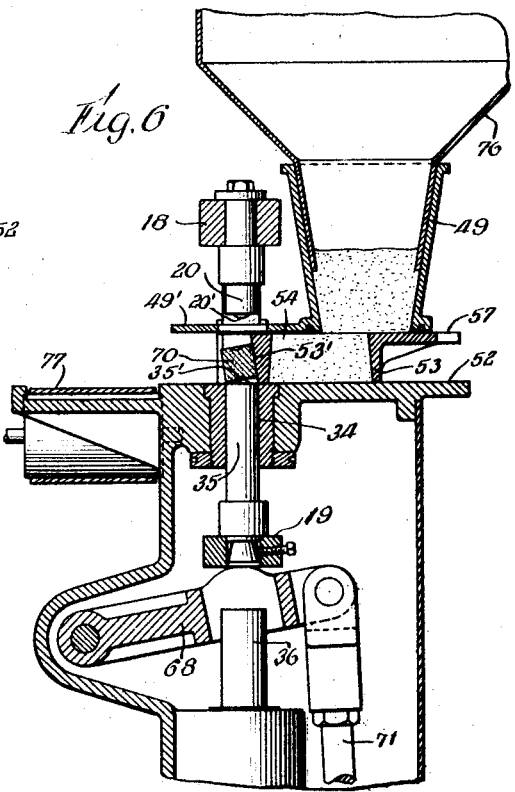
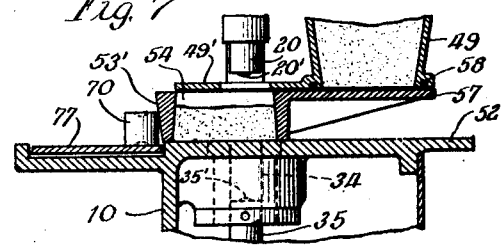
Inventor:
Joseph W. Bishop
By: Wm O Bell
Atty.

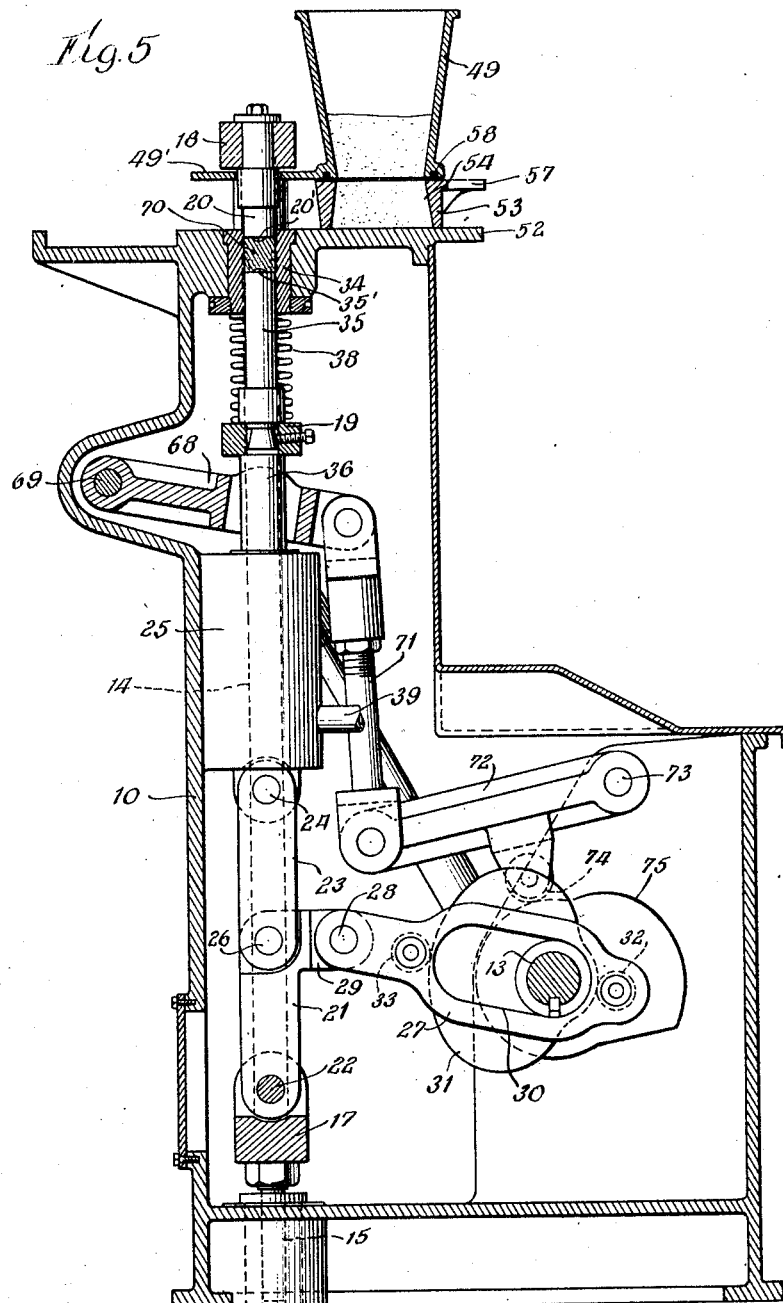

Patented Feb. 14, 1928.

1,659,077

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF WILMINGTON, DELAWARE, A CORPORATION OF DELAWARE.

MACHINE FOR MAKING BILLIARD CHALK OR THE LIKE.

Application filed February 18, 1925. Serial No. 9,933.

This invention relates to presses and has a particular relation to pressing machines for compressing material into blocks or cakes.

Another object of the invention is to provide a machine of simple construction and continuous operation for automatically making and discharging billiard chalk.

And a further object of the invention is to provide for making billiard chalk of uniform density and compactness under comparatively heavy pressure, so that the chalk may always be made according to a predetermined standard without any appreciable variation in the production from day to day.

I have illustrated in the accompanying drawings a selected embodiment of the invention, which has been found to give entirely satisfactory results in commercial production, and referring thereto Fig. 1 is a vertical sectional view of a machine embodying the invention, taken on the line 1—1 of Fig. 2.

Fig. 4 is a vertical section on the line 4—4 of Fig. 1.

Fig. 5 is a vertical section corresponding with Fig. 1 and showing the moving parts in a different position.

Fig. 6 is a sectional view of a part of the machine, showing the finished chalk about to be discharged.

Fig. 7 is a detail sectional view showing the finished chalk discharged and the feeder in die filling position.

Figure 2:
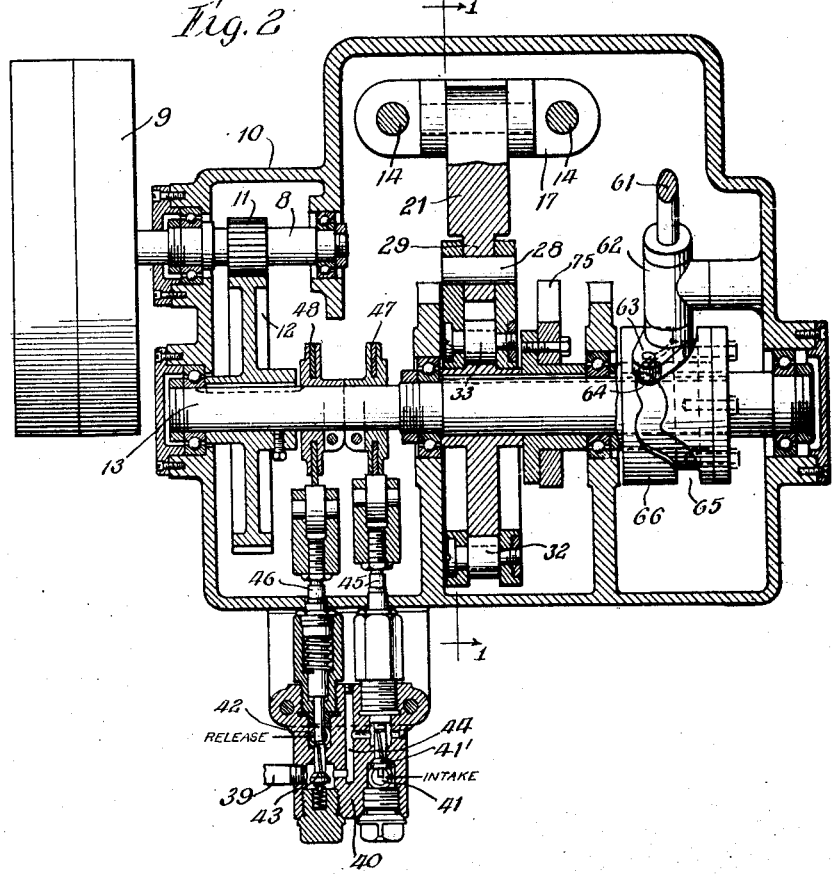
Fig. 2 is a horizontal section on the line 2—2 of Fig. 1.

Referring to the drawings, 8 is a drive shaft carrying the pulleys 9 and journaled in the frame 10 (Fig. 2). A pinion 11 on the drive shaft meshes with a gear 12 on the cam shaft 13 also journaled in the frame.

Two parallel rods 14 (Fig. 4) operate in guides 15 at the bottom of the frame and in guides 16 at the top of the frame and carry the bottom cross-bar 17 and the top cross-bar 18 forming a vertically movable frame which carries the upper plunger 20. This upper plunger frame is adapted to be operated by a toggle from the cam shaft and this toggle comprises an angular arm 21 (Fig. 1) pivotally engaged at 22 with the lower cross-bar 17, an arm 23 pivotally engaged at 24 with a bracket 25 on the frame and also pivotally engaged at 26 with the angle of the arm 21, and a lever 27 which is pivotally engaged at 28 with a short arm 29 of the angle arm and is provided with a slot 30 engaging the cam shaft 13. A cam 31 on the cam shaft operates between rollers 32, 33 on the lever 27 to move the lever forward and back for operating the toggle arms 21, 23. In the normal position of the machine, the lever 27 is retracted to break the toggle with the upper plunger in elevated position, Figs. 1, 4.

A tubular die in the form of a sleeve 34 (Fig. 1) is mounted in the frame in alignment with the upper plunger and a lower plunger 35 is carried by the intermediate cross-bar 19 and operates in the die through the bottom thereof. A ram 36 is arranged to operate in a hydraulic cylinder 37 in the bracket 25 to drive the plunger 35 up into the die 34 for compressing the chalk, and springs 38 operating between the intermediate cross-bar 19 and the top of the frame retract the lower plunger 35 from its projected position in the die. The cylinder 37 is connected at its lower end by a pipe 39 with the hydraulic valve casing designated generally 40 (Fig. 2). This valve casing has an intake 41 connected with a source of water under pressure and an outlet 41' to release the pressure from the cylinder 37 and permit the ram to retract. An intake valve 42 and a release valve 43 are arranged within the casing 40 and the intake valve opens and closes a passage 44 through the casing to the pipe connection 39 to the cylinder. The intake valve and the release valve are operated by spring pressed plungers 45, 46 which in turn are operated by cams 47, 48 on the cam shaft. In the normal operation of the machine, the release valve is closed when the intake valve is open and the intake valve is closed when the release valve is open.

Figure 1:
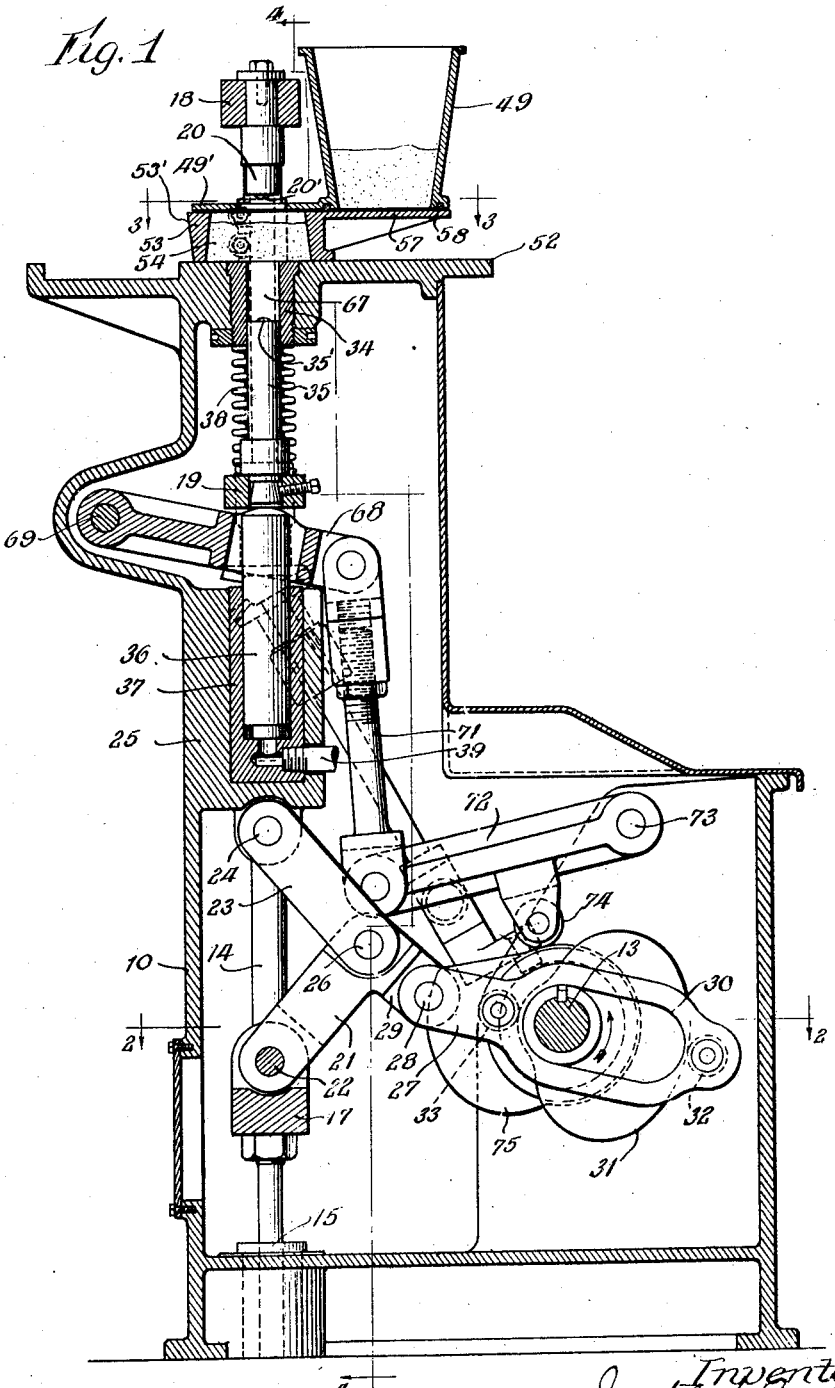
Figure 3:
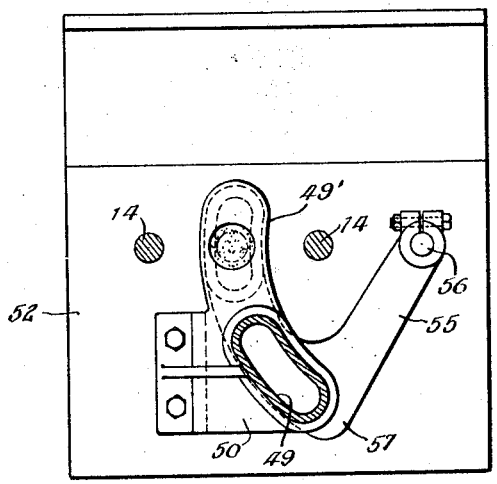
Fig. 3 is a detail section on the line 3—3 of Fig. 1.

A hopper 49 is mounted on a bracket 50 (Figs. 1, 3) above the table 52 of the frame to receive and hold a quantity of powdered chalk, from which the blocks or cakes of chalk are made. A feeder 53 having a pocket 54 open at top and bottom is carried by an arm 55 mounted on a shaft 56 and operates from a position beneath the hopper (Fig. 5) to a position between the plungers 20, 35 (Figs. 1, 7). The feeder has a flat surface 57 which forms a cut-off to close the lower end of the hopper when the pocket has been moved from beneath the hopper, and packing 58 is seated around the bottom of the hopper to make a tight joint with the feeder in the operation thereof. The bottom of the feeder operates in close contact with the table 52 to avoid waste of material. The shaft 56 carries a bevel gear 59 (Fig. 4) which meshes with a bevel gear 60 on a shaft 61, the two shafts 56 and 61 constituting, in effect, a single shaft. The lower end of the shaft 61 is mounted in a guide 62 (Fig. 2) and an arm 63 is mounted on the shaft 61 and carries a roller 64 which travels in the groove 65 of a cam 66 on the cam shaft. This cam groove is so shaped that the feeder is swung from its position beneath the hopper (Fig. 5) in the manner shown in Fig. 6 to the extreme position shown in Fig. 7 between the die plungers, and then it is moved back slightly to the position shown in Fig. 1 and again to the position shown in Fig. 7 before it returns to its initial position (Fig. 5) so that while the feeder pocket is positioned between the plungers an agitating movement is imparted to the feeder to insure deposit of sufficient chalk to fill the die cavity 67 and this quantity is determined for the die in the machine by position of the lower plunger in the die, as will be readily understood. The drawing shows the machine equipped for making cylindrical chalk blocks or cakes of a predetermined size, but the shape of the cake may be changed by providing suitably formed dies and plungers, and the size of the cake may be changed in the same way.

After the cake or block has been compressed by the die plungers, an ejector lever 68 pivoted to the frame at 69 (Fig. 1) is operated to eject the chalk block or cake 70 from the die (Fig. 6). The free end of the ejector lever 68 is connected by a rod 71 with a lever 72 pivoted to the frame at 73 and carrying a roller 74 which operates in engagement with a cam 75 on the cam shaft.

In practice a supply of powdered chalk is placed in the hopper and, if desired, supplemental hopper 76 (Fig. 6) may be mounted on the machine hopper 49 to provide a greater supply of chalk. In the initial position of the working parts of the machine, the die plungers are separated, and first the feeder is swung to carry the pocket filled with powdered chalk from the hopper to a position over the die so that the chalk may fill the die cavity. This is insured by the agitation imparted to the feeder by the cam 66 as hereinbefore mentioned. An apertured plate 49' on the bracket 50 is arranged above the die and table to form a partial closure for the top of the pocket when positioned above the die to prevent the loose material from escaping during the movement of the feeder.

If a block of chalk has just been made, it will be positioned on the lower plunger which lies flush with the table and the top of the die and in the path of the advancing feeder which, of course, will push it along off of the table and on to an endless conveyor 77, Fig. 7, which carries the chalk away from the machine as fast as it is made. It is customary to provide commercial billiard chalk with indentations in the top and bottom to receive the cue tip, and for this purpose the upper plunger has a projection 20' and the lower plunger has a projection 35'. In order to dislodge the chalk from the projection on the lower plunger, after it has been ejected by the lower plunger from the die, I bevel the front face 53' of the feeder (Fig. 6) so that it will tilt the chalk as shown and start the chalk moving off the lower plunger. To avoid interference between the projection 35 and the moving feeder the parts are timed so that the lower plunger will retract sufficiently to clear the feeder before it reaches the projection.

After the feeder has ejected the chalk previously made and filled the mold cavity with a supply of material for making the next chalk, the feeder returns to its normal position beneath the hopper and then the toggle is straightened to carry the upper plunger into the die at the top thereof, after which the hydraulic ram is operated to force the lower plunger into the die and compress the powdered chalk in the die against the upper plunger to form the block or cake. Then the toggle is broken to withdraw the upper plunger from the die and return it to its normal elevated position, after which the ejector is operated to thrust upward the lower plunger and eject the block or cake from the die and support it in position flush with the table in the path of the feeder in its next operation. Then the ejector is retracted and the springs 38 retract the lower plunger in the die so that the die cavity may again be filled with powder from the pocket of the feeder.

My invention provides a machine of simple construction which will operate automatically to make billiard chalk at a comparatively high rate of speed, without requiring any skilled attention; and more particularly it will make the billiard chalk uniformly solid and compact from day to day and of a standard size, with smooth surfaces. These are highly desirable characteristics of billiard chalk because it must not be too hard or too soft, it must rub off on the cue tip, but not too freely, and it must never have sharp or irregular edges, which might damage the cue tip. It is customary to paste a label about the chalk so that it can be handled without rubbing off on the fingers, and it is desirable to have a smooth surface to which the label may be applied in order to present a smooth and attractive appearance. My machine produces billiard chalk in a manner superior to the machines and methods heretofore employed, and by reason of its automatic operation and comparatively high speed, it is possible with my machine to make the billiard chalk in large quantities and more economically than has been done heretofore.

While I have described the machine as used for making billiard chalk, for which it is especially intended, I do not wish to be understood as restricting the invention to the manufacture of this particular product, for it will be readily understood that the invention may be used or adapted for other purposes without departing from the scope of the following claims.

I claim:

1. In a machine for making billiard chalk and the like, the combination of a frame, a cam shaft and a die supported in the frame, cams on said shaft, oppositely disposed plungers in the die, means operating between the plungers for supplying the die with material, mechanical means operated by some of said cams for moving one of the plungers, and hydraulic means controlled by other of said cams for actuating the other plunger to compress the material to the form of a block or cake in the die.

2. In a machine for making billiard chalk or the like, the combination of a frame, a die supported in the frame, oppositely disposed plungers operating in the die, means operating between the plungers for supplying the die with material, mechanical means for moving one of the plungers into the die and hydraulic means for moving the other plunger, to compress the material to the form of a block or cake, and means for ejecting the block or cake from the die, and springs for retracting said other plunger.

3. In a machine for making billiard chalk and the like, the combination of a frame, a cam shaft and a die supported in the frame, cams on said shaft, oppositely disposed plungers operating in the die, means operating between the plungers for supplying the die with material, mechanical means controlled by some of said cams for moving one of the plungers into the die, hydraulic means automatically operative on the movement of the mechanically moved plungers and controlled by some of said cams to move the other plunger and to compress the material to the form of a block or cake, and means controlled by other of said cams for actuating one of the plungers for ejecting the cake or block from the die.

4. In a machine for making billiard chalk and the like, the combination of a frame, a die supported in the frame, oppositely disposed plungers operating in the die, a hopper, means operating between the hopper and a position between the plungers for supplying the die with material, mechanical means for moving one of the plungers into the die, hydraulic means automatically operated after predetermined movement of the mechanically moved plunger to move the other plunger and compress the material in the form of a block or cake, a cam shaft supported by said frame, and means controlled by said cam shaft and moving one of said plungers for ejecting the block or cake from the die.

5. In a machine for making billiard chalk or the like, the combination of a frame, a die supported in the frame, oppositely disposed plungers operating in the die, feeding means operating between the plungers for supplying the die with material, means for agitating the feeding means to insure deposit of material in the die, and means for actuating the plungers to compress the material to the form of a block or cake.

6. In a machine for making billiard chalk or the like, the combination of a frame, a die supported in the frame, oppositely disposed plungers operating in the die, feeding means for supplying the die with material, means for operating said feeding means and for agitating the feeding means to insure deposit of material in the die, and means for actuating the plungers to compress the material to the form of a block or cake.

7. In a machine for making billiard chalk or the like, the combination of a frame, a die supported in the frame, oppositely disposed plungers operating in the die, feeding means for supplying the die with material, a cam shaft, a slotted cam on said shaft, means operating in said slotted cam and controlled thereby for operating the feeding means and for imparting thereto a back and forth movement to insure deposit of material in the die, mechanical means for moving one of the plungers, and hydraulic means actuated after predetermined movement of the mechanically moved plunger to actuate the other plunger and compress the material in the die into a cake.

8. In a machine for making billiard chalk or the like, the combination of a frame, a table on the frame, a die supported in the frame, oppositely disposed plungers operating in the die, feeding means arranged to travel on the table and for supplying the die with material, means for operating the feeding means and for agitating the same to insure deposit of material in the die, and means for actuating the plungers to compress the material to the form of a block or cake.

9. In a machine for making billiard chalk or the like, the combination of a frame, a table on said frame, a die supported in the frame flush with the surface of the table, oppositely disposed plungers operating in the die, feeding means arranged to travel on the table between the plungers for supplying the die with material, means for operating the feeding means to carry material to a position above the die so that the material may fill the die and then moving the feeding means away from the die, mechanical means for moving one of the plungers, hydraulic means actuated after predetermined movement of the mechanically moved plunger to compress the material into a die or cake, projections on said plungers to put an indentation in said cake and a spring for retracting the hydraulic plunger after each operation thereof.

10. In a machine for making billiard chalk or the like, the combination of a frame, a die supported in the frame and having a cavity therein open at its top and bottom, oppositely disposed plungers operating in the die, the lower plunger being normally positioned in the lower part of the die cavity, and the upper plunger being normally positioned above the die, means for supplying the die with material, a cam shaft supported by said frame, cams on said cam shaft, mechanical means including a toggle operated by some of said cams for actuating one of the plungers, hydraulic means controlled by some of said cams operative after the toggle is fully extended to move the other plunger for compressing the material between both of said plungers into the form of a cake, and means operated by other of said cams for ejecting the cake.

11. In a machine for making billiard chalk or the like, the combination of a frame, a table at the top of the frame, a die supported in the frame and table and having a cavity therein open at the top and bottom, oppositely disposed plungers operating in the die, the lower plunger being normally positioned in the lower part of the die cavity and the upper plunger being normally positioned above the die, feeding means for supplying the die with material, means for moving the feeding means on the table to a position above the die so that material therein may drop into the die cavity, mechanical means for moving one of the plungers and hydraulic means actuated after predetermined movement of the mechanically moved plunger to actuate the other plunger and compress the material in the die into a cake, and means operatively engaging the hydraulic plunger to move the plunger through the die and eject the cake.

12. In a machine for making billiard chalk or the like, the combination of a frame, a table at the top of the frame, a die supported in the frame and in the table, a material hopper supported on the frame, oppositely disposed plungers operating in the die, a cam shaft, a slotted cam on said shaft, feeding means engaging said slotted cam and operated thereby for carrying material from the hopper to a position over the die and agitating the same so that the material may drop into the die cavity, mechanical means for moving one of the plungers and hydraulic means actuated after predetermined movement of the mechanically moved plunger to actuate the other plunger and compress the material in the die into a cake.

13. In a machine for making billiard chalk or the like, the combination of a frame, a table at the top of the frame, a die supported in the frame and in the table, feeding means comprising a pocket to receive material from the hopper and to supply said material to the die, means for causing the feeding means to travel over the table until the pocket is disposed above the die and then returning the feeding means with its pocket disposed below the hopper, the feeding means having a flat surface to close the hopper when the pocket is moved from beneath the same, mechanical means for moving one of the plungers and hydraulic means actuated after predetermined movement of the mechanically moved plunger to actuate the other plunger and compress the material in the die into a cake.

14. In a machine for making billiard chalk or the like, the combination of a frame, a die supported in the frame and having a cavity open at the top and bottom, an upper plunger normally supported above the die, a lower plunger normally supported with its upper end in the lower part of the die cavity, feeding means for supplying the die with material, means for agitating the feeding means, mechanical means for operating the upper plunger to carry it into the upper end of the die cavity, hydraulic means for operating the lower plunger to compress the material in the cavity against the upper plunger, and independent means for causing upward movement of the lower plunger to eject the material from the die after it has been compressed.

15. In a machine for making billiard chalk or the like, the combination of a frame, a die supported in the frame and having a cavity open at the top and bottom, an upper plunger normally supported above the die, a lower plunger normally supported with its upper end in the lower part of the die cavity, means for filling the die cavity above the lower plunger with material, a cam shaft supported by said frame, cams on said shaft, toggle means operated by some of said cams for operating the upper plunger to carry it into the upper end of the die cavity, hydraulic means controlled by some of said cams for operating the lower plunger to compress the material in the die cavity against the upper plunger to the form of a block or cake, and independent means operated by other of said cams for ejecting said block or cake.

16. In a machine for making billiard chalk or the like, the combination of a frame, a die supported in the frame and having a cavity open at the top and bottom, an upper plunger normally disposed above the die, a lower plunger normally disposed with its upper end in the lower part of the die cavity, means for filling the die cavity above the lower plunger with material, mechanical means for operating the upper plunger to carry it into the upper end of the die cavity, hydraulic means for operating the lower plunger to compress the material in the die cavity against the upper plunger to the form of a block or a cake, independent means for retracting the lower plunger after the compressing operation, means for causing the lower plunger to eject the block or cake from the die, and a conveyor for carrying the finished article away after it has been ejected.

17. In a machine for making billiard chalk or the like, the combination of a frame, a die supported in the frame and having a die cavity open at the top and bottom, an upper plunger normally supported above the die, a lower plunger normally supported with its upper end in the lower part of the die cavity, feeding means for supplying the die with material, means for operating said feeding means, mechanical means for operating the upper plunger to carry it into the upper end of the die cavity, hydraulic means for operating the lower plunger to compress the material in the die cavity against the upper plunger to the form of a block or cake, independent means for retracting the lower plunger after the compressing operation, means for causing the lower plunger to eject the block or cake from the die into the path of the feeding means, and a conveyor for carrying the finished article away after it has been ejected.

18. In a machine for making billiard chalk or the like, the combination of a frame, a table at the top of the frame, a die supported in the frame and table and having a die cavity open at the top flush with the surface of the table and also open at the bottom, an upper plunger normally supported above the die, a lower plunger normally supported with its upper end in the lower part of the cavity, feeding means for supplying the die with material, a supply hopper on the frame, means for causing the feeding means to travel back and forth between the supply hopper and a position above the die and having a pocket to carry material from the hopper to the die, and means for operating said plungers to cause the upper plunger to enter the upper end of the die cavity, and then to cause the lower plunger to compress the material in the die cavity against the upper plunger to the form of a block or cake and for returning the upper plunger to normal position, independent means for retracting the plunger after the compressing operation, other independent means for causing the lower plunger to eject the block or cake from the die into the path of the feeding means, and a conveyor for carrying the block away from the machine after it has been ejected.

19. In a machine for making billiard chalk or the like, the combination of a frame, a die supported in the frame, an upper and a lower plunger operating in the die, the lower plunger having a projection at the top thereof for forming an indentation in the block or cake, means operating between the plungers for supplying the die with material, means for actuating the plungers to compress the material in the die to the form of a block or cake, means for causing the lower plunger to eject the block or cake from the die cavity, and means on the feeder for engaging the block or cake and tilting it to disengage said projection and indentation so that the block or cake may be moved relative to the lower plunger.

20. In a machine for making billiard chalk or the like, the combination of a frame, a die supported in the frame, an upper and a lower plunger operating in the die, a feeder operating between the plungers for supplying the die with material, means for actuating the plungers to compress the material in the die to the form of a block or cake, means for causing the lower plunger to eject the block or cake from the die, said lower plunger having a projection on its upper end to form an indentation in the bottom of the block or cake and said feeder having a beveled face to engage said block or cake and tilt it to disengage said projection and indentation so that the delivery movement of the block or cake may start without interference with the projection and without damage to the block or cake.

21. A machine for making billiard chalk or the like comprising a frame, a die supported in said frame, a cam shaft mounted in said frame, an upper plunger disposed above said die, mechanical means controlled by said cam shaft for raising and lowering the plunger, a second plunger disposed below said die, hydraulic means for raising the lower plunger, independent means for lowering the lower plunger after it has been raised by the hydraulic means, and ejector means controlled by the cam shaft.

22. A machine for making billiard chalk or the like comprising a frame, a die supported in said frame, means for feeding material into the die, a cam shaft mounted on said frame, an upper plunger disposed above said die, mechanical means controlled by said cam shaft for raising and lowering the plunger, a second plunger disposed below said die, hydraulic means for raising the second plunger to compress the material, independent means for lowering the lower plunger after it has been raised by the hydraulic means, and ejector means controlled by the cam shaft and operatively engaging the lower plunger for ejecting the compressed article.

23. A machine for making billiard chalk and the like comprising a frame, a die supported on said frame, means for feeding material into the die, a cam shaft mounted in said frame, an upper plunger disposed above said die, mechanical means controlled by said cam shaft for raising and lowering the plunger, a second plunger disposed below said die, hydraulic means for raising the lower plunger to compress the material, independent means for lowering the lower plunger and return it to normal position after it has been raised by the hydraulic means, ejector means controlled by the cam shaft and operatively engaging the lower plunger for ejecting the compressed article, and a conveyor arranged adjacent the ejector means.

24. A machine for making billiard chalk and the like comprising a frame, a die supported on said frame, means for feeding material into the die, a cam shaft mounted in said frame, an upper plunger disposed above said die, mechanical means controlled by said cam shaft for raising and lowering the plunger, a second plunger disposed below said die, hydraulic means for raising the lower plunger to compress the material, a pair of springs for lowering the lower plunger and returning it to normal position after it has been raised by the hydraulic means, ejector means controlled by the cam shaft and operatively engaging the lower plunger for ejecting the compressed article, and a conveyor arranged adjacent the ejector means for carrying the completed article away after it has been ejected.

25. In a machine for making billiard chalk and the like, the combination of a frame, a cam shaft mounted in said frame, an upper plunger, a lower plunger, means for operating said upper plunger, hydraulic means for raising said lower plunger, valves on said hydraulic means for operating the same, cams arranged on said shaft to open and close said valves to control the hydraulic means, and means for retracting the lower plunger after it has been raised by the hydraulic means.

26. In a machine for making billiard chalk and the like, the combination of a frame, a cam shaft mounted in said frame, an upper plunger, means for operating said plunger, a lower plunger, a die interposed between said plungers, means for feeding material into said die, hydraulic means for raising said lower plunger to compress the material, valves on said hydraulic means for operating the same, cams arranged on said shaft to open and close said valves to control the hydraulic means, means for retracting the lower plunger after it has been raised by the hydraulic means, and means controlled by the cam shaft for ejecting the material after it has been compressed.

JOSEPH W. BISHOP.